United States Patent
Kirkpatrick

(10) Patent No.: US 7,035,633 B2
(45) Date of Patent: Apr. 25, 2006

(54) APPARATUS FOR PROVIDING A GATEWAY BETWEEN A WIRED TELEPHONE AND A WIRELESS TELEPHONE NETWORK

(75) Inventor: Mark A. Kirkpatrick, Conyers, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 36 days.

(21) Appl. No.: 10/044,585

(22) Filed: Oct. 23, 2001

(65) Prior Publication Data
US 2004/0033786 A1 Feb. 19, 2004

(51) Int. Cl.
H04Q 7/20 (2006.01)
H04M 1/00 (2006.01)

(52) U.S. Cl. .............. 455/426.1; 455/426.2; 455/462; 455/550.1; 455/552.1

(58) Field of Classification Search ........... 450/422, 450/426, 461, 462, 552, 422.1, 426.1, 552.1, 450/426.2, 550.1, 3.04, 557
See application file for complete search history.

(56) References Cited

U.S. PATENT DOCUMENTS

| | | | |
|---|---|---|---|
| 4,922,517 A | 5/1990 | West Jr. et al. ............ 379/58 |
| 5,361,297 A | 11/1994 | Ortiz et al. ............... 379/130 |
| 5,365,573 A | 11/1994 | Sakamoto et al. .......... 379/61 |
| D354,749 S | 1/1995 | Phillips ................. D14/151 |
| D362,003 S | 5/1995 | Claudio ................. D14/240 |
| 5,469,494 A | 11/1995 | Ortiz et al. ................ 375/27 |
| 5,530,945 A | 6/1996 | Chavez, Jr. et al. ......... 379/62 |
| 5,535,274 A | 7/1996 | Braitbert et al. .......... 379/446 |
| 5,590,406 A | 12/1996 | Bayley et al. ............ 455/64.2 |
| 5,715,296 A | 2/1998 | Schomack et al. ........... 379/58 |
| 5,745,850 A | 4/1998 | Aldermeshian et al. ..... 455/417 |
| 5,812,637 A | 9/1998 | Schomack et al. ........... 379/59 |
| 5,818,915 A | 10/1998 | Hayes, Jr. et al. ......... 379/114 |
| 5,832,371 A | 11/1998 | Thornton ................. 455/90 |
| 5,859,894 A | 1/1999 | Ortiz et al. ............... 379/27 |
| 5,864,763 A | 1/1999 | Leung et al. ............. 455/557 |
| 5,894,596 A | 4/1999 | Hayes Jr. ................ 455/418 |
| 5,913,176 A | 6/1999 | Barabash ................. 455/560 |
| 5,946,616 A | 8/1999 | Schornack et al. ......... 455/422 |
| 5,966,428 A | 10/1999 | Ortiz et al. ............... 379/37 |

(Continued)

OTHER PUBLICATIONS

U.S. Official Action dated Jul. 15, 2005 in U.S. Appl. No. 10/319,937.

(Continued)

Primary Examiner—Nick Corsaro
(74) Attorney, Agent, or Firm—Merchant & Gould, LLC

(57) ABSTRACT

An apparatus is provided for creating a gateway between a wired telephone and a wireless telephone network. The gateway device is connected to a wired home telephone network having one or more wired telephones, a wired telephone network, such as the PSTN, and a wireless telephone network. The apparatus may operate in a first mode that allows the wired telephone network to be utilized as a primary telephone network for the wired home telephone network and the wireless telephone network to be utilized as a backup in case of failure of the wired telephone network. Alternatively, the apparatus may operate in a second mode that allows the wireless telephone network to be utilized as a primary telephone network for the wired home telephone network and the wired telephone network to be utilized as a backup in case of failure of the wireless telephone network. The selection of the operating mode for the apparatus may be based upon user selection, a user-specified time schedule, dialed digits, or other factors.

22 Claims, 4 Drawing Sheets

U.S. PATENT DOCUMENTS

| | | | | |
|---|---|---|---|---|
| 5,978,684 | A | 11/1999 | Cook et al. | 455/462 |
| 6,002,937 | A | 12/1999 | Young et al. | 455/462 |
| 6,014,560 | A | 1/2000 | Kramer | 455/414 |
| 6,018,665 | A | 1/2000 | Chavez, Jr. et al. | 455/462 |
| 6,032,034 | A | 2/2000 | Rabina et al. | 455/401 |
| 6,035,220 | A | 3/2000 | Claudio et al. | 455/564 |
| 6,073,010 | A | 6/2000 | Dufour | 455/432.3 |
| 6,122,514 | A | 9/2000 | Spaur et al. | 455/448 |
| 6,134,437 | A | 10/2000 | Karabinis et al. | 455/427 |
| 6,240,277 | B1 | 5/2001 | Bright | 455/74.1 |
| 6,259,905 | B1 | 7/2001 | Berkowitz et al. | 455/401 |
| 6,304,565 | B1 | 10/2001 | Ramamurthy | 370/352 |
| 6,324,410 | B1 | 11/2001 | Giacopilli et al. | 455/554 |
| 6,332,073 | B1 | 12/2001 | Nilsson et al. | 455/404 |
| 6,341,218 | B1 | 1/2002 | Poplawsky et al. | 455/90 |
| 6,377,825 | B1 | 4/2002 | Kennedy et al. | 455/569 |
| 6,405,027 | B1 | 6/2002 | Bell | 455/405 |
| 6,418,129 | B1 | 7/2002 | Fingerhut | 370/328 |
| 6,430,164 | B1 | 8/2002 | Jones et al. | 370/313 |
| 6,466,799 | B1 | 10/2002 | Torrey et al. | 455/462 |
| 6,498,938 | B1 * | 12/2002 | Morrow, Sr. | 455/557 |
| 6,516,192 | B1 | 2/2003 | Spaur et al. | 455/422 |
| 6,529,707 | B1 | 3/2003 | Dent | 455/13.1 |
| 6,535,743 | B1 | 3/2003 | Kennedy et al. | 455/456.1 |
| 6,553,237 | B1 | 4/2003 | Cantwell et al. | 455/516 |
| 6,600,925 | B1 | 7/2003 | Rams | 455/445 |
| 6,615,056 | B1 | 9/2003 | Taylor et al. | 455/554 |
| 6,625,034 | B1 | 9/2003 | Davis et al. | 361/759 |
| 6,625,457 | B1 | 9/2003 | Raith | 455/456.1 |
| 6,633,628 | B1 | 10/2003 | Linder et al. | 379/22.07 |
| 6,650,871 | B1 | 11/2003 | Cannon et al. | 455/41.2 |
| 6,704,580 | B1 * | 3/2004 | Fintel | 455/550.1 |
| 2001/0018326 | A1 | 8/2001 | Link, II | 455/3.05 |
| 2001/0029186 | A1 | 10/2001 | Canyon et al. | 455/462 |
| 2001/0041533 | A1 | 11/2001 | Schomack et al. | 455/3.05 |
| 2002/0068529 | A1 | 6/2002 | Knoble | 455/74.1 |
| 2002/0072390 | A1 | 6/2002 | Uchiyama | 455/557 |
| 2002/0106994 | A1 | 8/2002 | Payne et al. | 455/74.1 |
| 2002/0115455 | A1 | 8/2002 | Umstetter et al. | 455/462 |
| 2002/0128009 | A1 | 9/2002 | Boch et al. | 455/426 |
| 2002/0146977 | A1 | 10/2002 | Schomack, et al. | 455/3.05 |
| 2003/0017843 | A1 | 1/2003 | Noblins | 455/553 |
| 2004/0132447 | A1 | 7/2004 | Hirschfeld et al. | 455/426.2 |

OTHER PUBLICATIONS

U.S. Official Action dated Jul. 19, 2005 in U.S. Appl. No. 10/321,071.

"Andrew Corporations Extensis™Unit Extends Wireless Option for Mobile Professionals," Press Release, Mar. 20, 2001, Andrew Corporation, 2002. http://www.andrew.com/pressroom/pressreleases/english/01/20010320extensis.aspx.

"If You Have A Cell Phone, You Need A CellSocket..," 2001, 2002 WHP Wireless, Inc., http://www.cellsocket.com/welcome.html.

U.S. Appl. No. 10/324,543, entitled "Methods and Apparatus for Establishing A Fixed Wireless Telephone Service," filed Dec. 19, 2002, Inventor: James Bacon; Roberto Peon; Stephen Sherman.

U.S. Appl. No. 10/321, 071, entitled "Fixed Wireless Telephone Device," filed Dec. 16, 2002, Inventors: James Bacon; Elizabeth A. Mark.

U.S. Appl. No. 10/319,937, entitled "Call Handling For A Fixed Wireless Device," filed Dec. 16, 1002, Inventor: James Bacon.

U.S. Appl. No. 09/742,764 (Continuation-In-Part), entitled "Method and Apparatus for Fixing the Location of a Fixed Wireless Terminal In A Wireless Network," filed Dec. 20, 2002, Inventor: Charles M. Link, II.

U.S. Appl. No. 10/044,100, entitled "Wireless Telephone Base Unit With Multiple Cordless Handset Capability,"filed Oct. 19, 2001, Inventor: Mark A. Kirkpatrick.

U.S. Appl. No. 10/195,197, entitled, System and Method for Interfacing Plain Old Telephone System (POTS) Devices with Cellular Networks, filed Jul. 15, 2002, Inventors: Steven Neil Tischer, Kevin Paul Kleinfelter.

U.S. Appl. filed Dec. 30, 1999, entitled Method and Apparatus for Fixing the Location of a Fixed Wireless Terminal In A Wireless Network, Inventor: Charles M. Link, II.

U.S. Appl. No. 10/639,553, filed Aug. 12, 2003, entitled "Fixed Wireles Telephone Device", Inventor: Link.

U.S. Official Action dated Dec. 17, 2003 in U.S. Appl. No. 10/319,937.

U.S. Official Action dated Nov. 24, 2003 in U.S. Appl. No. 10/324,543.

U.S. Official Action dated Jan. 8, 2004 in U.S. Appl. No. 10/321,071.

U.S. Official Action dated Jun. 21, 2004 in U.S. Appl. No. 10/319,937.

U.S. Official Action dated Sep. 2, 2004 in U. S. Appl. No. 10/044,100.

U.S. Official Action dated Dec. 15, 2004 in U.S. Appl. No. 10/319,937.

* cited by examiner

APPARATUS FOR PROVIDING A GATEWAY BETWEEN A WIRED TELEPHONE AND A WIRELESS TELEPHONE NETWORK

TECHNICAL FIELD

The present invention generally relates to the field of wireless telecommunications. More specifically, the present invention relates to a gateway between a wired telephone network and a wireless telephone network.

BACKGROUND OF THE INVENTION

Most residential telephone service is provided utilizing a wire-based connection to an analog telephone network. This type of connection, known as a connection to the public switched telephone network ("PSTN") or plain old telephone service ("POTS") network, has long been the standard for providing residential phone service. A connection to a POTS network typically utilizes twisted pairs of copper wire as the transmission medium between the residence and the telephone network. While POTS networks provide extremely reliable telephone service, telephone users utilizing POTS networks do occasionally experience unavailability of service. Interruptions in service may be caused by electrical storms, equipment failure, broken line connections, and a host of other problems.

When a technical problem occurs that causes the POTS network to become unavailable, residential users until recently were unable to place or receive telephone calls. However, with the increased popularity of modern wireless telephone networks, many individuals subscribe to wireless telephone service in addition to their wire-based analog POTS service. Many times, wireless subscribers will utilize their wireless telephone in the event of a failure of their residential POTS service. Using a wireless telephone as a "backup" to POTS service in this manner may be effective for some subscribers, but can be frustrating for others. For instance, a subscriber may have wireless service associated with a telephone that is physically mounted in their automobile. If the POTS service is interrupted for such a user, they must physically go out to their automobile to make telephone calls. This can be inconvenient and frustrating for a subscriber, especially if the subscriber has to go out into the rain or snow to make a telephone call from their automobile. In other cases, a subscriber may be unable to utilize their wireless telephone as a backup to their POTS service because the battery in their wireless telephone is not charged, or if the battery drains due to extended use as a backup. In such cases, a subscriber would simply be unable to utilize their wireless telephone service as a backup to their POTS telephone service. In a situation such as this, it is desirable to have a backup to POTS service that is more conveniently accessible than wireless telephone.

In addition to utilizing wireless telephone service as an occasional backup to POTS service, some wireless subscribers occasionally choose to utilize their wireless telephones instead of their POTS service when at home. Use of a wireless telephone in this manner is driven primarily by the low cost of wireless telephone service, especially on nights and weekends when many wireless service plans offer "free" wireless airtime minutes. Some wireless service plans even offer "free" long distance service during these times. In such a scenario, a wireless telephone subscriber may utilize their wireless telephone to place calls during a certain time period, such as nights and weekends, and utilize their POTS service to place calls during other time periods, such as during the day when wireless service is charged at peak rates. As with using a wireless telephone as a backup, using a wireless telephone as an occasional supplement to POTS service can be inconvenient. For instance, in order to use a wireless telephone in this manner a subscriber must keep track of the rates for wired and wireless telephone calls during different times of the day and must always have a charged wireless telephone ready.

As a result of the low cost of wireless telephone service, some wireless subscribers have even decided to forego residential POTS service altogether. Instead, these users utilize wireless telephone service as their only telephone service, whether at the office, on the road, or at home. However, as with POTS service, wireless telephone service may become interrupted due to electrical storms, technical failure, excessive use of available capacity, and for other reasons. When wireless telephone service becomes unavailable, subscribers who do not have residential POTS service, and instead utilize only wireless telephone service, are completely unable to place or receive telephone calls. In a situation such as this, it is desirable to have a conveniently accessible backup to wireless telephone service.

Another drawback to utilizing wireless telephone service as the sole telephone service for a residence is that a single wireless telephone is the only telephone for making or receiving calls within the entire household. Because the analog POTS wiring and telephones in the home are incompatible with all wireless telephone networks, the convenience offered by having multiple extension telephones in a home cannot be realized when using wireless telephone service as the only service. In a situation such as this, it would be more convenient if the analog POTS wiring and telephones could be utilized to place and receive calls on a wireless telephone network.

Therefore, in light of the above, there is a need for a gateway apparatus that can provide an automatic and convenient backup to traditional POTS service using a wireless telephone network. Additionally, there is a need for a gateway apparatus that can provide telephone service to wired POTS telephones through a wireless telephone network. Furthermore, there is a need for a gateway apparatus that can utilize either a wired telephone network or a wireless telephone network as a telephone network for one or more wired telephones, the primary network being chosen based upon a user-specified time schedule or other factor.

SUMMARY OF THE INVENTION

The present invention solves the above problems by providing an apparatus that acts as a gateway between a wired home telephone network and a wireless telephone network. According to one embodiment of the invention, the apparatus can provide a backup to a wired home telephone network through a wireless telephone network if the connection between the wired home telephone network and a wired telephone network fails. According to this embodiment, all calls placed while in a backup mode on wired telephones connected to the wired home telephone network are completed the wireless network by the gateway apparatus provided herein. The gateway apparatus converts signals between the wired home telephone network and the wireless network in order to complete the telephone calls.

According to another actual embodiment of the present invention, a gateway apparatus is provided that permits the use of a wireless telephone network as a primary telephone network on a wired home telephone network. In order to provide such functionality, the gateway device is electrically connected to the wired home telephone network, including any wired telephones in the home. The gateway device also maintains a connection to a wired telephone network, such as the PSTN, and a wireless connection to a wireless telephone network. When calls are placed on a wired telephone, the gateway apparatus converts signals received from the wired telephone to signals compatible with the wireless telephone network and places the call on the wireless telephone network. The gateway apparatus continually converts signals between the wired home telephone network and the wireless network in order to facilitate the telephone call. The gateway apparatus is also operative to determine if a communications link exists with the wireless telephone network. If a communications link does not exist, the gateway apparatus is operative to electrically connect the wired home telephone network to a wired telephone network, such as the PSTN, thereby providing a wireline backup to the primary wireless telephone service.

According to yet another embodiment of the present invention, a gateway apparatus is provided that may operate in either of two modes of operation. In the first mode of operation, all calls made on wired telephones connected to a wired home network are routed by the gateway apparatus to a wired telephone network, such as the PSTN. The apparatus monitors the operational status of the wired telephone network to determine whether it is operational. In the event the wired telephone network is not operational, the apparatus routes telephone calls made on the wired home telephone network through a wireless telephone network. The apparatus also routes incoming calls received through the wireless telephone network to wired telephones on the wired home network.

In the second mode of operation, all calls made on wired telephones connected to a wired home network are routed by the gateway apparatus to a wireless telephone network. The apparatus monitors the operational status of the wireless telephone network to determine whether it is operational. In the event the wireless telephone network is not operational, the apparatus routes telephone calls made on the wired home telephone network through a wired telephone network. The apparatus also routes incoming calls received through the wired telephone network to wired telephones on the wired home network. The first or second modes of operation may be selected based upon a user-specified time schedule, dialed digits collected from a wired telephone on the wired home network, or other factors.

Additional details regarding the present invention will become apparent from the detailed description that follows.

DETAILED DESCRIPTION OF AN ILLUSTRATIVE EMBODIMENT

As described briefly above, the present invention provides a gateway apparatus for creating a gateway between a wired home telephone network and a wireless telephone network. The gateway device is connected to a wired home telephone network having one or more wired telephones, a wired telephone network such as the PSTN, and a wireless telephone network. According to one embodiment of the invention, the apparatus allows the wired telephone network to be utilized as a primary telephone network for the wired home telephone network and also allows the wireless telephone network to be utilized as a backup in case of failure of the wired telephone network. According to another embodiment of the invention, the apparatus allows the wireless telephone network to be utilized as a primary telephone network for the wired telephones and also allows the wired telephone network to be utilized as a backup in case of failure of the wireless telephone network.

According to yet another embodiment of the present invention, the gateway apparatus is operative to provide a dual mode of operation. In a first mode of operation, a wired telephone network may be utilized as a primary telephone network and a wireless telephone network may be utilized as a backup telephone network. In this mode of operation, all calls placed from the wired home telephone network are placed over the wired telephone network. In the event of failure of the wired telephone network, all calls placed on the wired home telephone network are placed over the wireless telephone network.

In a second mode of operation, a wireless telephone network is utilized as a primary telephone network and a wired telephone network is utilized as a backup telephone network. All calls placed by telephones connected to a wired home telephone network are placed over the wireless network. In the event of failure of the wireless telephone network, calls placed on the wired home telephone network are placed over the wired telephone network.

The first or second modes of operation may be selected based upon a user preference, a user specified time schedule, dialed digits collected from a wired telephone on the wired home network, or other types of factors.

Figure 1:
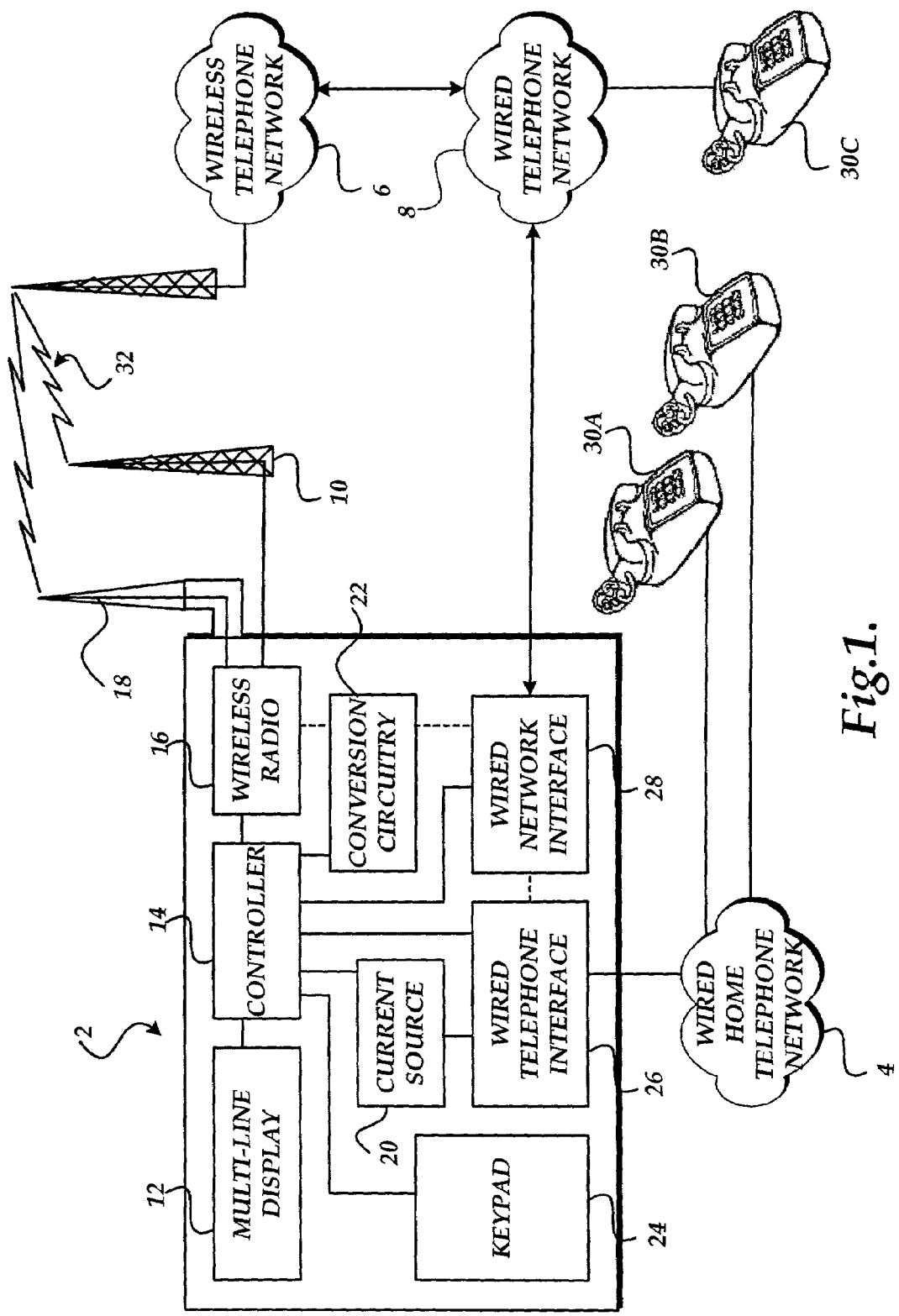
FIG. 1 is a block diagram showing an illustrative operating environment for one embodiment of the present invention and a hardware architecture for a gateway apparatus provided according to an actual embodiment of the present invention.

Referring now to the figures, in which like numerals represent like elements, an illustrative embodiment of the present invention will be described. FIG. 1 shows an illustrative operating environment for one embodiment of the present invention and a hardware architecture for an illustrative gateway apparatus provided herein. Referring now to FIG. 1, the gateway apparatus 2 and the illustrative operating environment for aspects of the present invention will be described. As shown in FIG. 1, a gateway apparatus 2 is provided that creates a gateway between a wired home telephone network 4 and a wired telephone network 8. The wired home telephone network 4 comprises the dual-pair copper wire utilized to connect one or more wired telephones 30A–30B to the wired telephone network 8 in a traditional manner. The wired telephone network 8 comprises a traditional analog wired telephone network such as the PSTN or POTS networks.

As shown in FIG. 1, the gateway apparatus 2 interfaces with the wireless home telephone network 4 through a wired telephone interface 26. In particular, the gateway apparatus 2 interfaces with the wired home telephone network 4 through the wired telephone interface 26 through the use of a standard RJ11 telephone plug. Through this interface, the gateway apparatus 2 is electrically connected to each of the wired telephones 30A–30B. A current source 20 is also provided that is electrically connected to the wired home telephone network 4. The current source 20 is utilized to provide an electrical current to the wired telephones 30A–30B that is compatible with the electrical current provided by the wired telephone network 8. In this manner, electrical current is provided to the telephones 30A–30B that may be utilized to provide ring signals and lighting. The specific operation of the wired telephone interface 26 and the current source 20 will be described in greater detail below with respect to FIGS. 3 and 4.

The gateway interface 2 also comprises a wired network interface 28. The wired network interface 28 also provides an interface to the wired telephone network 8. The wired network interface 28 provides functionality for determining whether the connection to the wired telephone network 8 is operative or inoperative. Through the use of the wired network interface 28 and the wired telephone interface 26, the wired telephones 30A–30B may be electrically connected or disconnected from the wired telephone network 8.

The gateway apparatus 2 also comprises a wireless radio 16. The wireless radio 16 may be connected to an internal antenna 18 or connected to an external antenna 10. Through the wireless radio 16, a wireless connection 32 may be established with the wireless telephone network 6. The wireless radio comprises a standard wireless radio compatible for use with a cellular telephone network or personal communications system network. Wireless radios for establishing such communication are well known to those skilled in the art.

The gateway apparatus 2 also comprises a multi-line display 12 and a keypad 24. The keypad 24 may be utilized for programming the operation of the gateway apparatus 2. The multi-line display 12 may also be utilized for programming the gateway apparatus 2, for displaying call progress indicators, configuration information, and other types of data. The gateway apparatus 2 also includes a controller 14 for controlling the operation of the gateway apparatus 2. The controller 14 may comprise a central processing unit, memory, and other circuitry. The controller 14, through the use of an operating program, controls the wired telephone interface 26, the wired network interface 28, the current source 20, the wireless radio 16, and the multi-line display 12.

In one embodiment of the present invention, a user may interact with the gateway apparatus 2 through the keyboard 24 and the multi-line display 12. According to one embodiment, the user may indicate that the gateway apparatus 2 is to utilize the wired telephone network 8 as a primary telephone network for the wired telephones 30A–30B and to utilize the wireless telephone network 6 as a backup network. According to this embodiment of the present invention, the wired network interface 28 is operative to determine whether a connection with the wired telephone network 8 becomes inoperative. If the connection becomes inoperative, the controller is operative to instruct the current source 20 to provide electrical current to the wired telephones 30A–30B.

If one of the wired telephones 30A–30B is placed in an off-hook position, the wired telephone interface 36 detects the off-hook state and notifies the controller 14. The controller 14 may then instruct the wired telephone interface 26 to provide a dial tone signal to the wired telephones 30A–30B and to receive one or more dialed digits from the wired telephones 30A–30B. Once the dialed digits have been received, the controller 14 instructs the wireless radio 16 to place a wireless telephone call over the wireless connection 32 through the wireless telephone network 6.

If a call is established through the wireless telephone network 6, the conversion circuitry 22 is utilized to convert between signals received at the wireless radio 16 and signals received at the wired telephone interface 26. In this manner, the wired telephones 30A–30B can be utilized to place a call over the wireless telephone network 6 in much the same way that a call would be traditionally placed over the wired telephone network 8. Additional details regarding the operation of the gateway apparatus 2 in this mode will be described in greater detail below with respect to FIG. 4.

According to another embodiment of the invention, a user may interact with the gateway apparatus 2 through the keypad 24 and the multi-line display 12 to instruct the gateway apparatus 2 to utilize the wireless telephone network 6 as a primary telephone network and to utilize the wired telephone network 8 only in the event that the wireless connection 32 with the wireless telephone network 8 becomes inoperative. In this embodiment of the present invention, the wired telephones 30A–30B may be utilized to place and receive telephone calls over the wireless telephone network 6 through the wired telephone interface 26, the conversion circuitry 22, and the wireless radio 16. If the wireless radio 16 determines that the wireless connection 32 has become inoperative, the controller 14 will then instruct the wired network interface 28 to electrically connect the wired home telephone network 4 to the wired telephone network 8. After such a connection is made, the wired telephones 30A–30B may be utilized to place or receive telephone calls over the wired telephone network 8 in a traditional fashion. Additional details regarding this mode of operation for the gateway apparatus 2 will be described in greater detail below with respect to FIG. 3.

Figure 2:
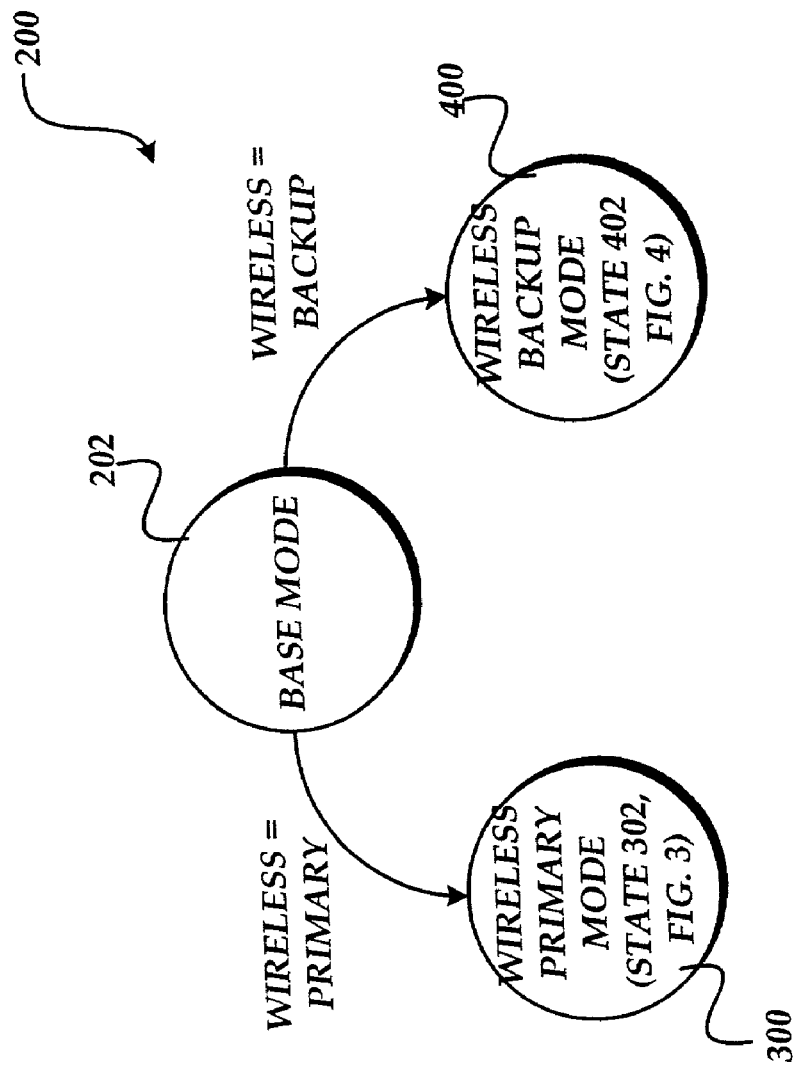
FIG. 2 is a state diagram illustrating a base mode of operation for a gateway apparatus provided according to one actual embodiment of the present invention.

Referring now to FIG. 2, a state machine 200 will be described illustrating the operation of the gateway apparatus 2. As shown in FIG. 2, the state machine 200 begins in state 202, the base mode of operation for the gateway apparatus 2. In the base mode state 202, the gateway apparatus 2 determines whether the wireless connection 32 should be utilized as a primary mode of communication for the wired telephones 30A–30B or whether the wireless connection 32 should be utilized as a backup connection. In one embodiment, the determination as to whether the wireless connection 32 should be utilized as a primary or backup telephone connection is based upon user preference. For instance, a user may indicate through the use of the keypad 24 that the gateway apparatus should always operate in a mode where the wireless connection 32 is utilized as the primary telephone connection. Alternatively, the user may utilize the keypad 24 to indicate that the wireless connection 32 should always be utilized as a backup for the wired connection.

In another embodiment of the present invention, the gateway apparatus 2 may be programmed to utilize the wireless connection 32 as a primary connection during certain time periods and to utilize the wireless connection as a backup connection during other time periods. In this embodiment of the invention, the user may be permitted to provide a user specified time schedule for defining when the gateway apparatus 2 should operate in either mode. The controller 14 may then store this information in a memory and utilize this information to switch between the proper mode at the appropriate time. In this manner, a user may program the gateway apparatus 2 to switch between modes based on the currently available rates for either the wired telephone network 8 or the wireless telephone network 6. For instance, the gateway apparatus 2 may be programmed to utilize the wireless telephone network 6 as a primary telephone network during nights and weekends when wireless rates are inexpensive. During other times, when wireless telephone calls are charged at a peak rate the wired telephone network 8 may be utilized.

According to another embodiment of the present invention, the gateway apparatus 2 may be programmed through the use of the keypad 24 to select its mode of operation based upon dialed digits collected from one of the wired telephones 30A–30B. In this manner, the wired telephone network 8 may be utilized for certain types of telephone calls (e.g., local telephone calls) and the wireless telephone network 6 may be utilized for other types of calls (e.g., long distance telephone calls). Those skilled in the art should appreciate that the gateway apparatus 2 may utilize other types of factors to determine whether the wireless connection 32 should be utilized as a primary telephone connection or a backup telephone connection.

If the gateway apparatus 2 determines at state 202 that the wireless telephone connection should be utilized as a primary telephone connection, the state machine 200 transitions from state 202 to state 300. State 300 is a mode in which the wireless connection 32 is used as a primary mode of communication for the wired home telephone network 4. The operation of the gateway apparatus 2 in this state is described in greater detail below with respect to FIG. 3.

If, at state 202, the gateway apparatus 2 determines that the wireless connection 32 should be utilized as a backup connection for the wired home telephone network 4, the state machine 200 transitions to state 400. State 400 constitutes the operating mode in which the gateway apparatus 2 operates to provide a backup connection through the wireless telephone network 6. The wireless backup mode is described in greater detail below with respect to FIG. 4.

Figure 3:
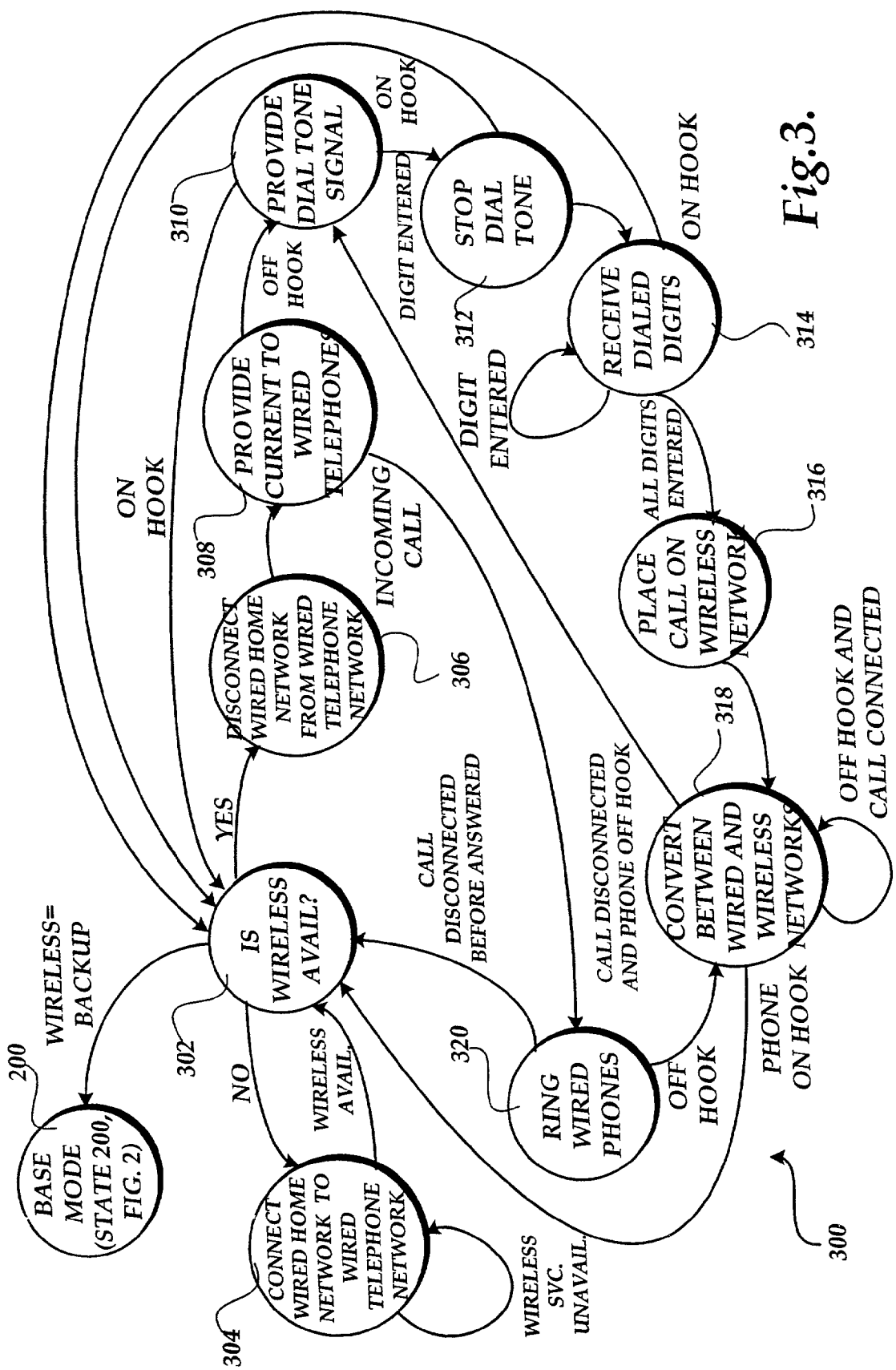
FIG. 3 is a state diagram illustrating a mode of operation for a gateway apparatus provided according to one actual embodiment of the present invention in which a wireless telephone network is utilized as a backup to traditional POTS service on wired telephones.

Referring now to FIG. 3, a state machine 300 will be described that illustrates the operation of the gateway apparatus 2 in an operating mode in which a wireless connection 32 is utilized as a primary telephone network for the wired telephones 30A–30B. The state machine 300 begins at block 302, where the gateway apparatus 2 determines whether the wireless connection 32 is operative. If the gateway apparatus 2 determines that the wireless connection 32 is inoperative, the state machine 300 transitions to state 304. At state 304, the gateway apparatus 2 connects the wired home telephone network 4 to the wired telephone network 8 through the wired network interface 28. In this manner, the wired telephone network 8 may be utilized as a backup telephone network in the event of the failure of the wireless connection 32. The state machine 300 remains at state 304 as long as the wireless connection 32 remains unavailable. If the wireless connection 32 becomes operative, the state machine 300 transitions from state 304 back to state 302.

If, at state 302, the gateway apparatus 2 determines that the wireless connection 32 is available, the state machine 302 transitions to state 306. At state 306, the gateway apparatus 2 disconnects the wired home telephone network 4 from the wired telephone network 8. Because the wireless telephone network 6 will be utilized as a primary mode of communication, a connection to the wired telephone network 8 is not needed. The wired network interface 28 and the wired telephone interface 26 are utilized to disconnect the wired home telephone network 4 from the wired telephone network 8.

From state 306, the state machine 300 transitions to state 308, where electrical current is provided by the gateway apparatus 2 to the wired home telephone network 4. The current source 20 provides electrical current which may be utilized by the wired telephones 30A–30B to generate a ring tone or to light a display. The electrical current generated by the current source 20 is identical to that received by the wired telephones 30A–30B from the wired telephone network 8.

At state 308 the gateway apparatus 2 also determines whether an incoming telephone call has been detected at the wireless radio 16. If such an incoming call is detected, the state machine 300 transitions from state 308 to state 320. At state 320, a ring signal is provided to the wired home telephone network 4 by the wired telephone interface 26. This ring signal causes a ring tone to be generated at the wired telephones 30A–30B. At state 320, a determination is also made as to whether the incoming call has been disconnected before it is answered at one of the wired telephones 30A–30B. If the incoming call is disconnected before it is answered, the state machine 300 transitions back to state 302. If one of the wired telephones 30A–30B is placed in an off-hook state to answer the incoming call, the state machine 300 transitions to state 318.

At state 318, signals are converted between the wireless radio 16 and the wired telephone interface 26. In this manner, signals received from the wireless radio 16 may be transmitted to the wireless telephones 30A–30B. Similarly, voice signals received at the wireless telephones 30A–30B may be transmitted through the wireless radio 16 to the wireless telephone network 6. In this manner, the incoming telephone call may be received and conducted on one of the wired telephones 30A–30B. This conversion process continues, and the state machine 300 remains at state 318, as long as the wired telephone remains in an off-hook state and the call remains connected.

At state 318 a determination is also made as to whether the wired telephone on which the call is being conducted has been placed in an on-hook state. If the wired telephone is placed in an on-hook state, the call is disconnected and the state machine returns to state 302. If the call becomes disconnected but the wired phone remains in an off-hook state, the state machine transitions to state 310 where a dial tone signal may be provided to the wired telephone.

At state 308, a determination is also made as to whether one of the wired telephones 30A–30B has been placed in an off-hook state. If one of the wired telephones 30A–30B is placed in an off-hook state, the state machine 300 transitions from state 308 to state 310. At state 310, a dial tone signal is provided through the wired home telephone network 4 to the wired telephone that has been placed in an off-hook state. The dial tone signal may be provided by the wired telephone interface 26 to simulate a traditional dial tone signal that would be provided from the wired telephone network 8. In another embodiment of the invention, no dial tone signal is provided.

At state 310, the gateway apparatus 2 makes a determination as to whether the wired telephone has been placed in an on-hook state. If the wired telephone has been placed in an on-hook state, the state machine 300 transitions from state 310 to state 302. A determination is also made at the state 310 by the gateway apparatus 2 as to whether a dialed digit has been entered on the wired telephone. If a digit has been entered, the state machine 300 transitions to state 312, where the dial tone signal is ended. If the wired telephone is placed in an on-hook state while at state 302, the state machine 300 transitions back to state 302. Otherwise, the state machine 300 transitions from state 312 to state 314.

At state 314 additional dialed digits are received from the wired telephone. If the wired telephone is placed in an on-hook position at state 314, the state machine transitions to state 302. Once all of the digits have been entered, the state machine 300 transitions from state 314 to state 316, where the dialed digits are utilized by the wireless radio 16 to initiate a telephone call through the wireless telephone network 6.

If a call is established through the wireless telephone network 6, the state machine 300 then transitions to state 318, where the conversion circuitry 22 is utilized to convert signals between the wireless radio 16 and the wired telephone interface 26. In his manner, the wired telephones 30A–30B may be utilized to place a telephone call through the wireless telephone network 6. If the wired telephone is placed in an on-hook state at state 318, the state machine 300 returns to state 302.

At state 302, a determination is also made as to whether the gateway apparatus 2 should change operating modes to utilize the wireless telephone network 8 as a backup to the wired telephone network 4. This may occur in response to a user changing a configuration of the gateway apparatus 2. This may also occur in response to the gateway apparatus 2 determining programmatically that it would change state based on a user specified condition. If the gateway apparatus determines that the wireless connection 32 should be utilized as a backup to a wired connection, the state machine 300 transitions back to state 200 described above with respect to FIG. 2.

Figure 4:
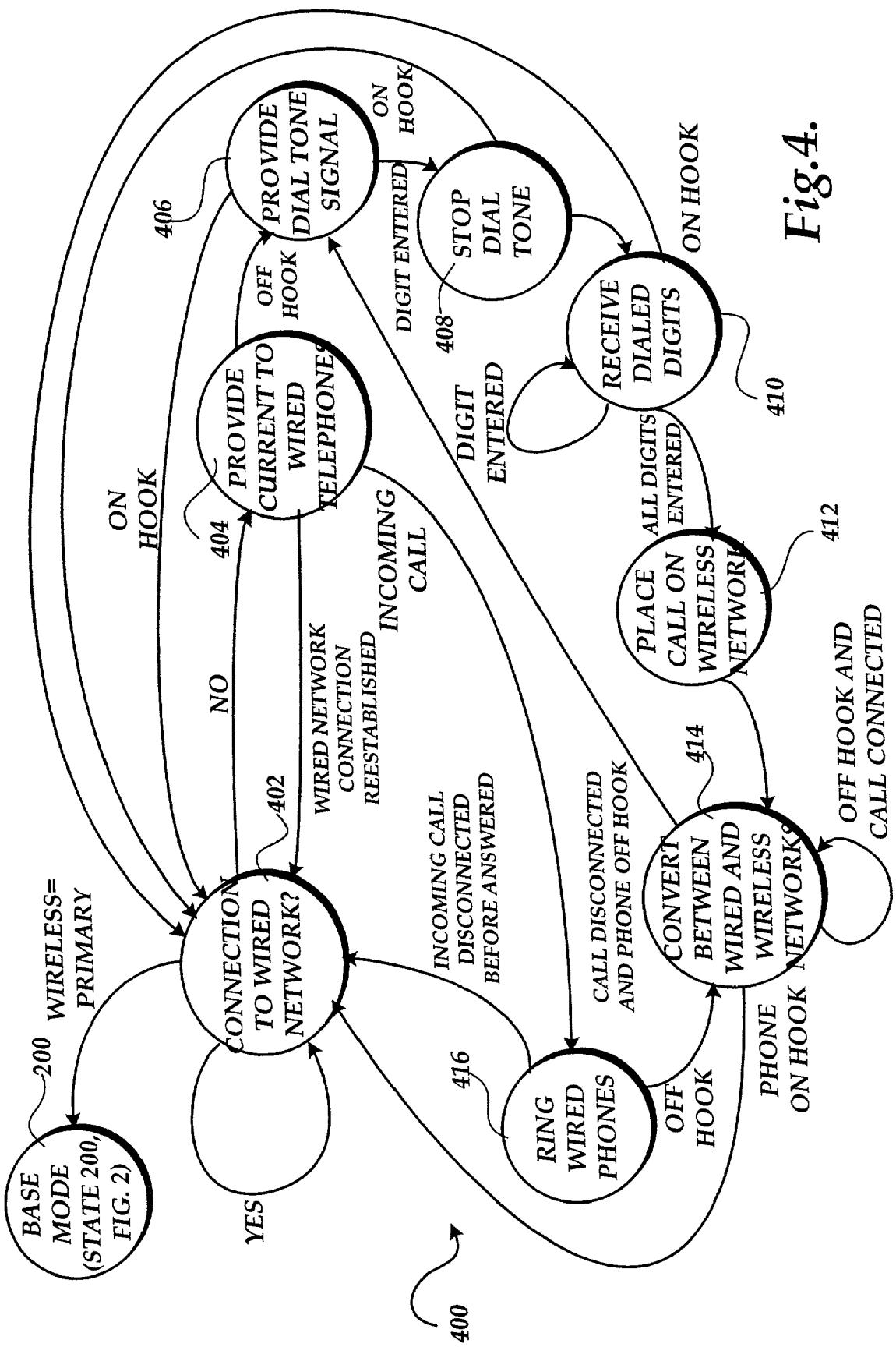
FIG. 4 is a state diagram illustrating a mode of operation for a gateway apparatus provided according to one actual embodiment of the present invention in which a wireless telephone network is utilized as a primary telephone network for one or more wired telephones and a traditional POTS service is utilized as a backup.

Referring now to FIG. 4, a state machine 400 will be described that illustrates the operation of the gateway apparatus 2 in a mode of operation in which the wired telephone network 8 is utilized as a primary telephone network and the wireless telephone network 6 is utilized as a backup. The state machine 400 begins at state 402, where the gateway apparatus determines whether a connection to the wired telephone network 8 is operative. As long as the connection to the wired telephone network 8 remains operative, the state machine 400 remains at state 402. In this state, the wired home telephone network 4 is electrically connected to the wired telephone network 8 through the wired telephone interface 26 and the wired network interface 28. Through this electrical connection, wired telephones 30A–30B may place calls over the wired telephone network 8 in a traditional manner.

If, at state 402, the gateway apparatus determines that the connection to the wired telephone network 8 has become inoperative, the state machine 400 transitions from state 402 to state 404. At state 404, an electrical current is provided to the wired home telephone network 4 by the current source 20. As described above, the electrical current is compatible with that provided by the wired telephone network 8 and may be utilized by the wired telephones 30A–30B to generate a ring signal or to light a telephone display.

At state 404, a determination is made as to whether the connection to the wired telephone network 8 has been reestablished. If the connection to the wired telephone network 8 has been reestablished, the state machine 400 transitions from state 404 back to state 402 where the wired telephone network 8 will again be used as the primary telephone network. A determination is also made at step 404 as to whether an incoming wireless telephone call is detected at the wireless radio 16. If such an incoming call is detected, the state machine transitions from state 404 to state 416. At state 416, a ring signal is provided to the wired home telephone network 4 thereby ringing each of the wired telephones 30A–30B. If the incoming call disconnects before it is answered at one of the wired telephones 30A–30B, the state machine 400 returns to state 402. If one of the wired telephones 30A–30B is placed in an off-hook state thereby answering the incoming telephone call, the state machine 400 transitions to state 414.

At state 414, the conversion circuitry 22 is utilized to convert signals between those received at the wireless radio 16 and those received at the wired telephone interface 26. In this manner, the wired telephones 30A–30B may be utilized to answer and conduct the incoming telephone call over the wireless telephone network 6. At state 414 a determination is also made as to whether the wired telephone has been placed in an on-hook state. If, at state 414, it is determined that the wired telephone is placed in an on-hook state, the state machine 400 transitions back to state 402. As long as the wired telephone 30A–30B is remains in an off-hook state and the call remains connected to the wireless radio 16, the state machine 400 remains at state 414. If the call becomes disconnected from the wireless radio 16 but the wired telephone remains in an off-hook state, the state machine 400 transitions to state 406.

At state 404, a determination is also made as to whether one of the wired telephones 30A–30B is placed in an off-hook state in order to place an outgoing telephone call. If the gateway apparatus 2 determines that one of the wired telephones 30A–30B has been placed in an off-hook state, the state machine 400 transitions to state 406. At state 406, the wired telephone interface 26 provides a dial tone signal to the wired telephone that has been placed in an off-hook state. By providing a synthetic dial tone to the wired telephone, the experience of placing a telephone call over a wired telephone 8 may be provided. Alternatively, no dial tone may be provided to the wired telephone placed in an off-hook state.

If, at state 406, the wired telephone is placed in an on-hook state, the state machine 400 returns to state 402. If, at state 406, the gateway apparatus 2 determines that a digit has been entered on the wired telephone, the state machine 400 transitions to state 408, where the dial tone signal is stopped. If, at state 408, the wired telephone is placed in an on-hook state, the state machine 400 transitions back to state 402. Otherwise, the state machine transitions from state 408 to state 410, where additional dialed digits are received from the wired telephone. If all of the digits have been entered at the wired telephone, the state machine 400 transitions to state 412, where the dialed digits are utilized by the wireless radio 16 to place an outgoing telephone call over the wireless telephone network 6. When a call is established over the wireless telephone network 6, the state machine 400 transitions to state 414.

As discussed above, at state 414 signals are converted between the wireless radio 16 and the wired telephone interface 26. This permits a wireless telephone call to be placed over the wireless telephone network 6 through one of the wired telephones 30A–30B. Because the gateway apparatus 2 automatically utilizes the wireless telephone network 6 in the event that the wired telephone network 8 becomes inoperative, it should not be apparent to the user of the wired telephones 30A–30B which network is being utilized. If the wired telephone is placed in an on-hook state, the state machine 400 transitions from state 414 back to state 402.

A determination is also made at state 402 as to whether the gateway apparatus has been placed in a mode of operation in which the wireless connection 32 should be utilized as a primary telephone network. This may occur in response to a user selection of such a mode, or in response to the gateway apparatus 2 determining that it should change modes based on user identified parameters. In the event that the gateway apparatus 2 determines that it should switch to the mode in which the wireless connection 32 is utilized as a primary telephone connection, the state machine 400 transitions from state 402 to state 200, described above with respect to FIG. 2.

Based on the foregoing it should be appreciated that the present invention provides an apparatus for creating a gateway between a wired telephone network and a wireless telephone network. The gateway apparatus allows wired telephones to utilize either a wired telephone network as a primary network or a wireless telephone network as a primary telephone network. The gateway apparatus also allows a wired telephone network to be utilized as a backup for a wireless telephone network and allows a wireless telephone network to be utilized as a backup to a wired telephone network. The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for providing a gateway between one or more wired telephones and a wireless telephone network wherein each of said one or more telephones are directly connected to a wired home telephone network without modification, the apparatus comprising:
   a wireless radio operative to communicate with said wireless telephone network over a wireless communications link;
   a wired telephone interface electrically coupled to said one or more wired telephones directly connected to said wired home telephone network without modification; and
   a controller, said controller operative to:
   detect an incoming telephone call at said wireless radio, provide a ring signal through said wired telephone interface operative to ring said one or more wired telephones in response to detecting said incoming telephone call, and
   in response to determining that a one of said one or more wired telephones has been placed in an off hook state, establish a communications channel between said wired telephone interface and said wireless radio, thereby permitting said incoming telephone call to be received on said one of said wired telephones placed in an off hook state; and a multi-line display and a keypad utilized for programming said apparatus;
   wherein said apparatus maintains a connection to said wireless telephone network while receiving incoming telephone calls via a wired telephone network; and
   wherein said apparatus is located between said wired home telephone network and said wired network and is operative to electrically connect said wired home telephone network to said wired telephone network while bypassing said wireless telephone network.

2. The apparatus of claim 1, wherein said controller is further operative to:
   determine whether one of said one or more wired telephones has been placed in an off hook state;
   collect one or more dialed digits from said one of said one or more wired telephones placed in an off hook state;
   instruct said wireless radio to establish an outgoing telephone call over said wireless telephone network utilizing said dialed digits; and
   to establish a communications channel between said wired telephone interface and said wireless radio, thereby permitting said outgoing telephone call to be placed on said one of said wired telephones placed in an off hook state.

3. The apparatus of claim 2, wherein said wired telephone interface further comprises a current source for delivering an electrical current to said one or more wired telephones compatible with POTS service to provide ring signals to said one or more wired telephones.

4. The apparatus of claim 3, wherein said wired telephone interface is further operative to deliver a dial tone signal to said one or more wired telephones in response to determining that a one of said one or more wired telephones has been placed in an off hook state.

5. The apparatus of claim 4, further comprising a wired network interface electrically coupled to said wired telephone network, and wherein said controller is further operative to:
   determine whether said wireless communications link exists between said wireless radio and said wireless telephone network, and
   in response to determining that said wireless communications link does not exist, to electrically connect said wired telephone interface and said wired network interface, thereby electrically connecting said one or more wired telephones to said wired telephone network so that telephone calls placed on said one or more wired telephones will be placed over said wired telephone network.

6. A method for providing a gateway between a wired telephone directly connected to a wired home telephone network and a wireless telephone network, comprising:
   detecting an incoming wireless telephone call over said wireless telephone network; providing a ring signal to said wired telephone directly connected to said wired home network in response to detecting said incoming call;
   determining whether said wired telephone has been placed in an off hook state in response to said ring signal; and
   in response to determining that said wired telephone has been placed in an off hook state, converting said incoming wireless telephone call to a format compatible with said wired telephone and converting signals received at said wired telephone to a format compatible with said wireless telephone network, thereby permitting said incoming telephone call to be received and conducted on said wired telephone,
   wherein said gateway maintains a connection with a wired telephone network and said wireless telephone network even when receiving an incoming telephone call over said wireless telephone network;
   wherein said gateway is located between said wired home telephone network and said wired network and is operative to electrically connect said wired home telephone network to said wired telephone network while bypassing said wireless telephone network; and
   wherein said wired home telephone network comprises dual-pair copper wire utilized to connect said wired telephone to said wired telephone network.

7. The method of claim 6, further comprising:
delivering an electrical current to said wired telephone compatible with POTS service to provide ring signals to said wired telephone;
determining if said wired telephone has been placed in an off hook state; in response to determining that said wired telephone has been placed in an off hook state,
receiving one or more dialed digits from said wired telephone;
placing an outgoing wireless telephone call over said wireless telephone network using said dialed digits; and
converting signals associated with said outgoing wireless telephone call to a format compatible with said wired telephone and converting signals received at said wired telephone to a format compatible with said wireless telephone network, thereby permitting said outgoing telephone call to be placed and conducted on said wired telephone.

8. The method of claim 7, further comprising:
providing a dial tone signal to said wired telephone in response to determining that said wired telephone has been placed in an off hook state.

9. The method of claim 8, further comprising:
determining whether a valid communications link exists over said wireless telephone network; and
in response to determining that a valid communications link does not exist over said wireless telephone network, electrically connecting said wired telephone to said wired telephone network via said gateway.

10. The method of claim 9, further comprising:
determining whether a valid communications link has been reestablished over said wireless telephone network; and
in response to determining that a valid communications link has been reestablished over said wireless telephone network, electrically disconnecting said wired telephone from said wired telephone network.

11. An apparatus for providing a gateway between one or more wired telephones and a wireless telephone network wherein said one or more wired telephones are directly connected to a wired home network, comprising:
a wireless radio operative to communicate with said wireless telephone network over a wireless communications link;
a wired telephone interface electrically coupled to said one or more wired telephones directly connected to said wired home network;
a wired network interface electrically coupled to a wired telephone network;
a current source; and
a controller operative to determine whether a connection between said one or more wired telephones and said wired telephone network is operative wherein said controller maintains a connection with said wired telephone network and said wireless telephone network and, in response to determining that said connection between said one or more wired telephones and said wired network is inoperative, said controller further operative to:
cause said current source to deliver an electrical current to said one or more wired telephones compatible with POTS service,
detect an incoming telephone call at said wireless radio,
provide a ring signal through said wired telephone interface operative to ring said one or more wired telephones in response to detecting said incoming telephone call and,
in response to determining that a one of said one or more wired telephones has been placed in an off hook state, said controller operative to establish a communications channel between said wire telephone interface and said wireless radio, thereby permitting said incoming telephone call to be received on said one of said wired telephones placed in an off hook state;
wherein said gateway is located between said wired home telephone network and said wired network and is operative to electrically connect said wired home telephone network to said wired telephone network while bypassing said wireless telephone network.

12. The apparatus of claim 11, wherein in response to determining that said connection between said one or more wired telephones and said wired network is inoperative, said controller is further operative to:
determine whether one of said one or more wired telephones has been placed in an off hook state;
collect one or more dialed digits from said one of said one or more wired telephones placed in an off hook state;
instruct said wireless radio to establish an outgoing telephone call over said wireless telephone network utilizing said dialed digits; and
to establish a communications channel between said wired telephone interface and said wireless radio, thereby permitting said outgoing telephone call to be placed on said one of said wired telephones placed in an off hook state.

13. The apparatus of claim 12, wherein said wired telephone interface is further operative to deliver a dial tone signal to said one or more wired telephones in response to determining that a one of said one or more wired telephones has been placed in an off hook state.

14. The apparatus of claim 13, wherein said controller is further operative to:
determine whether a connection between said one or more wired telephones and said wired telephone network has been reestablished, and
in response to determining that said connection between said one or more wired telephones and said wired telephone network has been reestablished, to electrically connect said wired telephone interface and said wired network interface, thereby electrically connecting said one or more wired telephones to said wired telephone network so that telephone calls placed on said one or more wired telephones will be placed over said wired telephone network.

15. A method for providing a gateway between one or more wired telephones and a wireless telephone network wherein said one or more wired telephones are directly connected to a wired home network, comprising:
determining whether a connection between said one or more wired telephones directly connected to said wired home network and a wired telephone network is operative wherein said gateway maintains a connection with said wired telephone network and said wireless telephone network;
in response to determining that said connection between said one or more wired telephones and said wired network is inoperative,
delivering an electrical current to said one or more wired telephones compatible with POTS service,
detecting an incoming telephone call at a wireless radio,
providing a ring signal to said one or more wired telephones in response to detecting said incoming telephone call and, in response to determining that a one of said one or more wired telephones has been placed in an off hook state, establishing a communications channel between said one or more wired telephones and said wireless telephone network, thereby permitting said incoming telephone call to be received on said one of said wired telephones placed in an off hook state;

wherein said gateway is located between said wired home telephone network and said wired network and is operative to electrically connect said wired home telephone network to said wired telephone network while bypassing said wireless telephone network.

16. The method of claim 15, further comprising:

in response to determining that said connection between said one or more wired telephones and said wired network is inoperative, determining whether one of said one or more wired telephones has been placed in an off hook state;

collecting one or more dialed digits from said one of said one or more wired telephones placed in an off hook state;

establishing an outgoing telephone call over said wireless telephone network utilizing said dialed digits; and establishing a communications channel between said one or more wired telephones placed in an off hook state and said wireless network, thereby permitting said outgoing telephone call to be placed on said one of said wired telephones placed in an off hook state.

17. The method of claim 16, further comprising:

delivering a dial tone signal to said one or more wired telephones in response to determining that a one of said one or more wired telephones has been placed in an off hook state.

18. The method of claim 17, further comprising:

determining whether a connection between said one or more wired telephones and said wired telephone network has been reestablished, and in response to determining that said connection between said one or more wired telephones and said wired telephone network has been reestablished, electrically connecting said one or more wired telephones to said wired telephone network so that telephone calls placed or received on said one or more wired telephones will be placed or received over said wired telephone network.

19. A computer-controlled apparatus for providing a gateway between a wired home telephone network and a wireless telephone network, said apparatus operative to:

provide a first mode of operation in which said apparatus is operative to monitor an operational status of a wired telephone network and to route a telephone call made from said wired home telephone network via a wired telephone directly connected to said wired home telephone network through said wireless telephone network in response to determining that said wired telephone network is not operational while maintaining an inoperative connection with said wired telephone network; and provide a second mode of operation in which said apparatus is operative to monitor an operational status of said wireless telephone network and to route a telephone call made from said wired home network via a wired telephone directly connected to said wired home telephone network through said wired telephone network in response to determining that said wireless telephone network is not operational while maintaining an inoperative connection with said wireless telephone network;

wherein said apparatus is located between said wired home telephone network and said wired network and is operative to electrically connect said wired home telephone network to said wired telephone network while bypassing said wireless telephone network.

20. The apparatus of claim 19, wherein either of said first or second modes may be selected as a mode of operation for said computer-controlled apparatus, and wherein said mode of operation is selected based upon a user-specified schedule.

21. The apparatus of claim 19, wherein either of said first or second modes may be selected as a mode of operation for said computer-controlled apparatus, and wherein said mode of operation is selected based upon dialed digits collected from a wired telephone directly connected to said wired home telephone network.

22. The apparatus of claim 1, wherein said multi-line display displays at least one of call progress indicators or configuration information.

* * * * *